(12) United States Patent
Rasras et al.

(10) Patent No.: US 7,164,824 B2
(45) Date of Patent: Jan. 16, 2007

(54) WAVEGUIDE TURN FOR A WAVEGUIDE CIRCUIT

(75) Inventors: Mahmoud Rasras, New Providence, NJ (US); Annjoe G. Wong-Foy, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/009,646

(22) Filed: Dec. 10, 2004

(65) Prior Publication Data

US 2006/0127009 A1    Jun. 15, 2006

(51) Int. Cl.
G02B 6/26    (2006.01)
G02B 6/42    (2006.01)
G02B 6/10    (2006.01)

(52) U.S. Cl. .......................... 385/50; 385/31; 385/39; 385/47; 385/129; 385/132

(58) Field of Classification Search ................. 385/17, 385/18; 398/4, 8, 9, 14, 39, 40, 129–132
See application file for complete search history.

(56) References Cited

U.S. PATENT DOCUMENTS

| | | | |
|---|---|---|---|
| 6,049,641 A * | 4/2000 | Deacon et al. ............... 385/15 |
| 6,325,553 B1 * | 12/2001 | Deacon et al. ............... 385/89 |
| 6,529,655 B1 * | 3/2003 | Jurbergs ....................... 385/19 |
| 6,542,657 B1 * | 4/2003 | Anderson ..................... 385/18 |
| 6,546,163 B1 * | 4/2003 | Thackara ...................... 385/18 |
| 6,634,759 B1 * | 10/2003 | Li ............................... 359/853 |
| 6,711,323 B1 * | 3/2004 | Nayyer ........................ 385/22 |
| 6,832,031 B1 * | 12/2004 | Smaglinski .................. 385/47 |
| 6,934,429 B1 * | 8/2005 | Kikuchi et al. .............. 385/14 |
| 2004/0202424 A1 * | 10/2004 | Cournoyer et al. .......... 385/39 |
| 2004/0258347 A1 * | 12/2004 | Gothoskar et al. ........... 385/39 |
| 2005/0111781 A1 * | 5/2005 | Jain et al. .................... 385/15 |
| 2005/0152633 A1 * | 7/2005 | Li et al. ....................... 385/14 |
| 2005/0170146 A1 * | 8/2005 | Troll ........................... 428/156 |

* cited by examiner

Primary Examiner—Brian Healy
Assistant Examiner—Charlie Peng

(57) ABSTRACT

A waveguide turn having two waveguides oriented at an angle with respect to one another and optically coupled to one another by a reflective surface. In one embodiment, the reflective surface is a side of a trench formed in the core and cladding regions of the waveguides, which is designed to reflect light based on total internal reflection (TIR). The reflective surface can be designed to have an appropriate curved shape to reduce coupling losses between the waveguides. Due to relatively sharp turn (reflection) angles accessible with the reflective surface, the circuit area occupied by a waveguide turn of the invention is significantly smaller than that for a typical prior-art waveguide turn.

16 Claims, 4 Drawing Sheets

WAVEGUIDE TURN FOR A WAVEGUIDE CIRCUIT

BACKGROUND OF THE INVENTION

1. Field of the Invention

The present invention relates to optical communication equipment and, more specifically, to optical waveguide devices.

2. Description of the Related Art

A typical buried-channel silica waveguide has a relatively large turn radius. For example, a waveguide having a 0.5% refractive-index contrast between its core and cladding regions has a turn radius of at least about 5 mm. This relatively large turn radius might disadvantageously affect the size of waveguide circuits.

SUMMARY OF THE INVENTION

Problems in the prior art are addressed, in accordance with the principles of the present invention, by a waveguide turn having two waveguides oriented at an angle with respect to one another and optically coupled to one another by a reflective surface. In one embodiment, the reflective surface is a side of a trench formed in the core and cladding regions of the waveguides, which is designed to reflect light based on total internal reflection (TIR). The reflective surface can be designed to have an appropriate curved shape to reduce coupling losses between the waveguides. Due to relatively sharp turn (reflection) angles accessible with the reflective surface, the circuit area occupied by a waveguide turn of the invention is significantly smaller than that for a typical prior-art waveguide turn.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
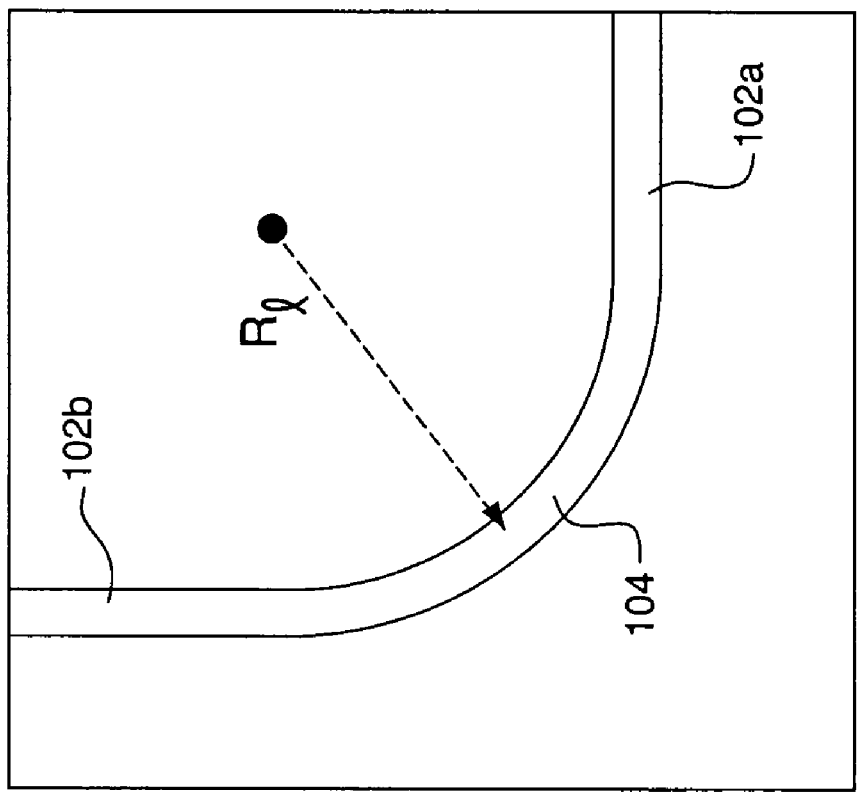
FIG. 1 shows a top view of an optical device having a prior-art waveguide turn.

FIG. 1 shows a top view of an optical device 100 having a prior-art waveguide turn. More specifically, device 100 has two planar waveguides 102a and 102b oriented at 90 degrees with respect to one another and connected by a curved linker 104. Each of waveguides 102a–b and linker 104 has core and cladding regions formed on a substrate with FIG. 1 showing the contours of the core regions. The index of refraction of the core regions is higher than that of the cladding regions, which provides both lateral and transverse confinement of light in the core region.

It is well known in the art that, to avoid large signal losses, linker 104 should preferably have a curvature radius greater than a certain minimum value. For example, in device 100 implemented with a refractive-index contrast value ($\Delta$) of about 4%, linker 104 has the radius, $R_1$, of at least about 350 µm, where $\Delta$ is defined by Eq. (1) as follows:

$$\Delta = \frac{n_{core} - n_{cl}}{n_{cl}} \quad (1)$$

where $n_{cl}$ and $n_{core}$ are the refractive indices of the cladding and core regions, respectively. As a result, the waveguide turn of device 100 occupies a circuit area of about 350×350 µm².

Figure 2:
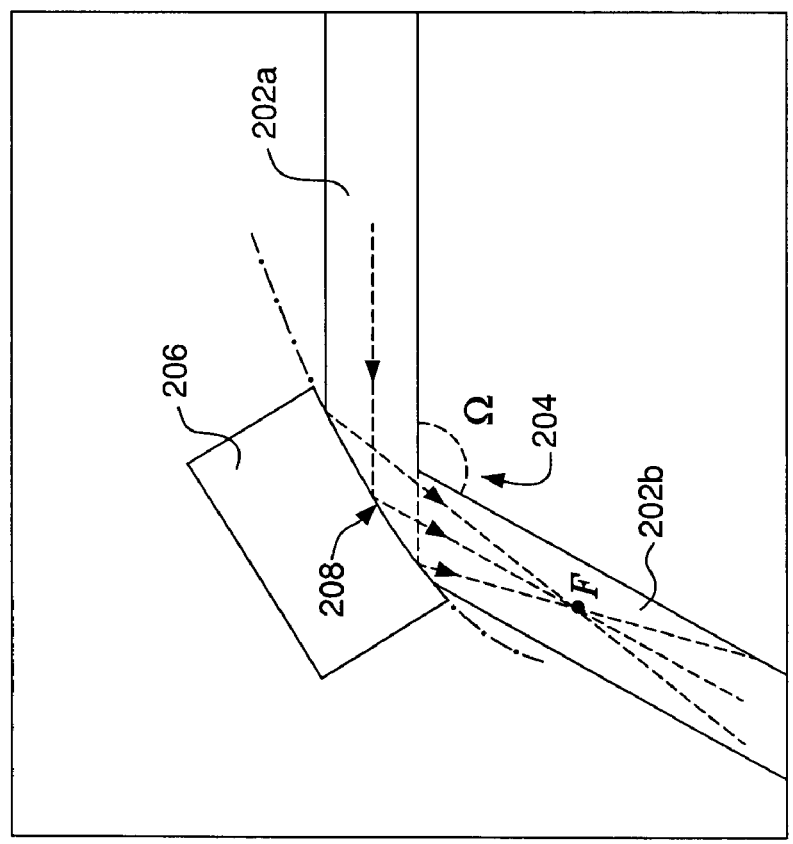
FIG. 2 shows a top view of an optical device having a waveguide turn according to one embodiment of the invention.

FIG. 2 shows a top view of an optical device 200 having a waveguide turn according to one embodiment of the invention. More specifically, device 200 has two waveguides 202a and 202b, which are similar to waveguides 102a and 102b of device 100. Waveguides 202a and 202b are oriented at an angle $\Omega$ with respect to one another and are optically coupled by a linker structure 204. Linker structure 204 includes (i) intersecting terminal portions of waveguides 202a–b and (ii) a trench 206 formed in the core and cladding regions of these terminal portions and filled with a material having a relatively low refractive index. For example, in one embodiment, trench 206 is filled with an ambient gas such as air. Due to a relatively large refractive-index contrast between trench 206 and the core region of waveguides 202a–b, side 208 of the trench can function as a total-internal-reflection (TIR) mirror. One skilled in the art will understand that, to enable TIR, angle $\Omega$ should be greater than two times the value of the critical TIR angle ($\theta_C$). For example, when $n_{core}$=1.5 and trench 206 is filled with air, $\theta_C \approx 42$ degrees and $\Omega$ can be as sharp as about 84 degrees. However, when side 208 has a reflective coating, these restrictions on angle $\Omega$ do not apply.

In different embodiments, side 208 can be designed to have a flat (planar) shape or an appropriate curved shape. For example, in the embodiment shown in FIG. 2, side 208 of trench 206 has a parabolic shape, i.e., that of a segment of a parabolic curve indicated by the dash-dotted line. The shape and orientation of side 208 in FIG. 2 can be selected as explained below such that: (1) a focal point F defined by the parabolic shape of side 208 is located inside waveguide 202b and (2) a ray of light propagating along the center axis of waveguide 202a is directed by side 208 to propagate along the center axis of waveguide 202b. This shape and orientation of side 208 can advantageously minimize coupling losses between waveguides 202a–b.

Figure 3:
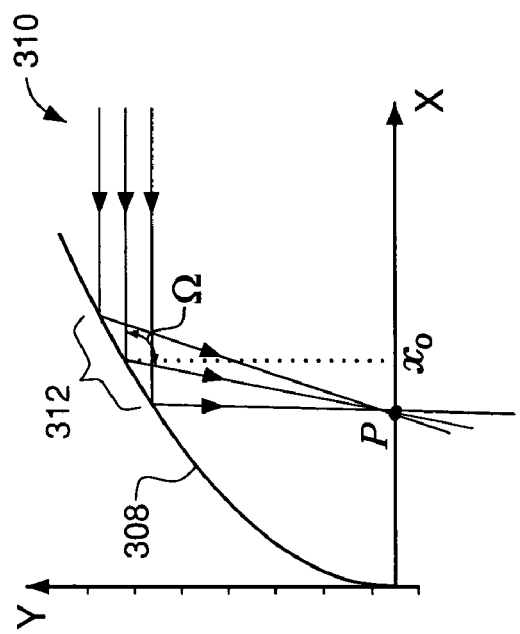
FIG. 3 graphically illustrates optical properties of the waveguide turn of FIG. 1 according to one embodiment of the invention.

FIG. 3 graphically illustrates optical properties of side 208 of trench 206 according to one embodiment of the invention. More specifically, FIG. 3 shows a parabola 308 described by Eq. (2):

$$y = 2\sqrt{Px} \quad (2)$$

Parabola 308 has a focal point with coordinates (x=P, y=0). This means that a collimated beam of light 310 impinging upon parabola 308 parallel to the X-axis is focused at that focal point as shown in FIG. 3. An appropriate segment 312 of parabola 308 for the implementation of side 208 can be selected using the relationships between angle $\Omega$ and a derivative of the parabola given by Eq. (3a) as follows:

$$\frac{\Omega}{2} = \frac{\pi}{1} - \arctan\frac{dy}{dx}\bigg|_{x=x_0} = \frac{\pi}{2} - \arctan\sqrt{\frac{P}{x_0}} \quad (3a)$$

where $x_0$ is the X-coordinate of approximately the middle point of segment 312. If side 208 does not have a reflective coating, then the constraints given by Eq. (3b) should also be taken into account:

$$\theta_C < \frac{\Omega}{2} < \frac{\pi}{2} \quad (3b)$$

For example, when beam 310 corresponds to waveguide 202a, side 208 can be designed to have the shape and orientation corresponding to those of segment 312.

As can be seen from Eq. (3), for a given value of $\Omega$, different parabolic shapes can satisfy Eq. (3). More specifically, as long as the ratio of $P/x_0$ has a correct value (defined by Eq. (3a)), appropriate segments from different (i.e., having different P values) parabolas can be used. However, when the distance from segment 312 to the focal point is constrained (e.g., to a specified length), this additional constraint together with Eq. (3a) defines a unique choice of P and $x_0$ values for the implementation of side 208.

Figure 4:
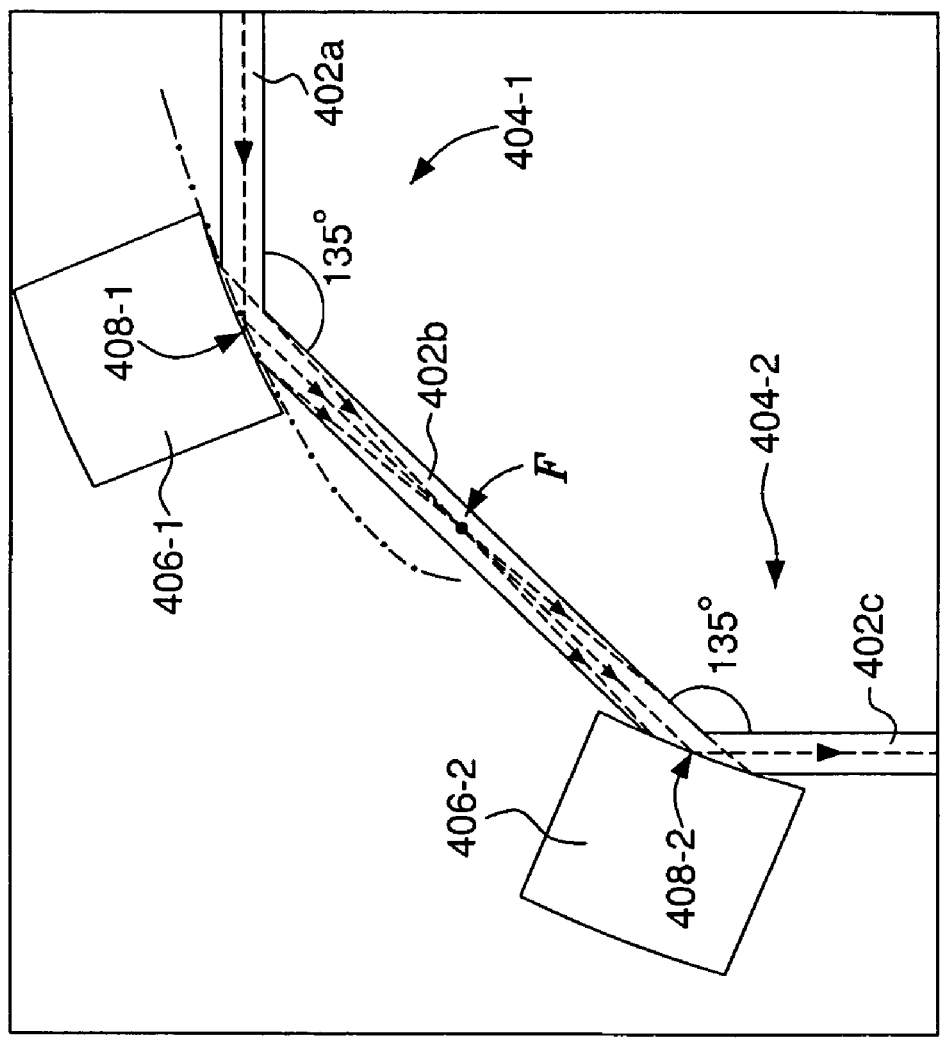
FIG. 4 shows a top view of an optical device having a 90-degree waveguide turn according to one embodiment of the invention.

FIG. 4 shows a top view of an optical device 400 having a 90-degree waveguide turn according to one embodiment of the invention. More specifically, device 400 has three waveguides 402a–c, which are optically coupled using two linker structures 404-1 and 404-2. Each of waveguides 402 or linker structures 404 of device 400 is analogous to waveguide 202 or linker structure 204, respectively, of device 200. Due to the relatively small size of linker structures 404-1 and 404-2, the size of the 90-degree waveguide turn in device 400 can advantageously be about ten times smaller than the size of that in prior-art device 100 (FIG. 1).

Linker structure 404-1 includes (i) intersecting terminal portions of waveguides 402a–b and (ii) a trench 406-1. Side 408-1 of trench 406-1 has a parabolic shape indicated by the parabola indicated by the dash-dotted line in FIG. 4. The parabolic shape of side 408-1 defines a focal point F, which is located inside waveguide 402b as shown in FIG. 4. Linker structure 404-1 has an angle $\Omega$ of about 135 degrees. As a result, a ray of light propagating along the center axis of waveguide 402a is reflected from side 408-1 to propagate along the center axis of waveguide 402b, thereby producing a change in direction of about 45 degrees.

Linker structure 404-2, which includes intersecting terminal portions of waveguides 402b–c and a trench 406-2, is substantially a mirror image of linker structure 404-1 with respect to the plane passing through focal point F and orthogonal to waveguide 402b. In addition, the length of waveguide 402b is such that the focal points defined by the parabolic shapes of sides 408-1 and 408-2 substantially coincide. As a result, light focused by linker structure 404-1 at focal point F is effectively re-collimated by linker structure 404-2 as shown in FIG. 4. Therefore, when a collimated beam of light is coupled into waveguide 402a, a similarly collimated beam of light will be directed by linker structures 404-1 and 404-2 into waveguide 402c.

One skilled in the art will understand that, when having a collimated-beam coupling between the waveguides is not required, waveguide 402b might have a different length, which does not result in the coincidence of the focal points defined by the parabolic shapes of sides 408-1 and 408-2. In addition or alternatively, device 400 might be implemented such that linker structures 404-1 and 404-2 are not mirror images of one another.

Figure 5:
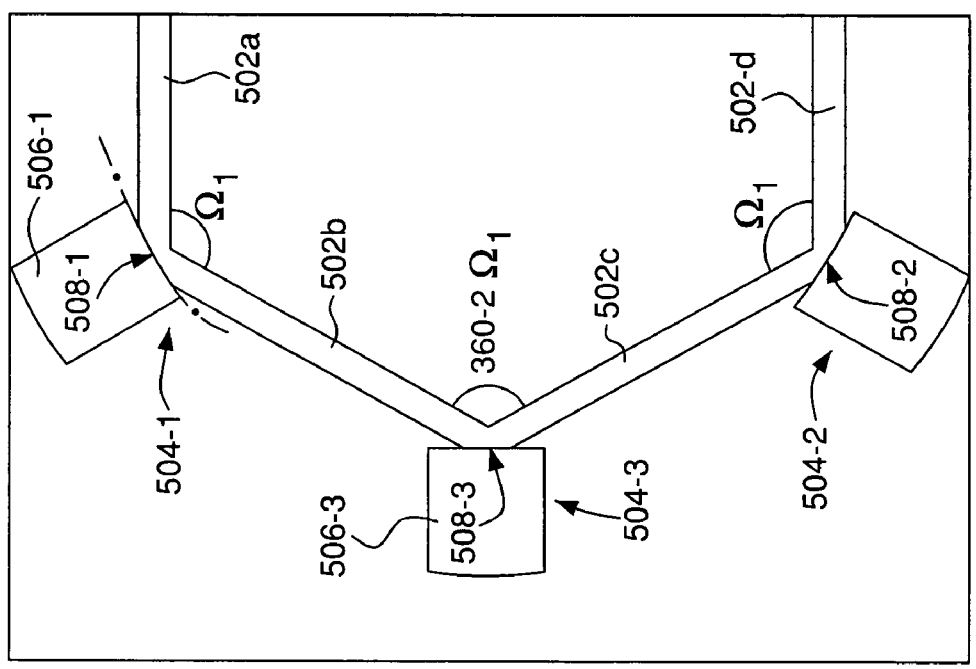
FIG. 5 shows a top view of an optical device having a 180-degree waveguide turn according to one embodiment of the invention.

FIG. 5 shows a top view of an optical device 500 having a 180-degree waveguide turn according to one embodiment of the invention. More specifically, device 500 has four waveguides 502a–d, which are optically coupled using three linker structures 504-1, 504-2, and 504-3. Linker structure 504-1 has an angle $\Omega_1$ and includes (i) intersecting terminal portions of waveguides 502a–b and (ii) a trench 5 parabola shown by the dash-dotted line in FIG. 5. Linker structure 504-2 includes intersecting terminal portions of waveguides 502c–d and is substantially a mirror image of linker structure 504-1. Linker structure 504-3 has an angle $360°-2\Omega_1$ and includes (i) intersecting terminal portions of waveguides 502b–c and (ii) a trench 506-3. Trench 506-3 is generally similar to trench 506-1, except that a reflecting side 508-3 of the former is flat rather than of a parabolic shape as reflecting side 508-1 of the latter.

A ray of light propagating along the center axis of waveguide 502a is reflected from side 508-1 to propagate along the center axis of waveguide 502b, thereby producing a change in direction of about $180°-\Omega_1$. Said reflected ray (propagating along the center axis of waveguide 502b) is then reflected from side 508-3 to propagate along the center axis of waveguide 502c, thereby producing an additional change in direction of about $2\Omega_{1-180}°$. This reflected ray (propagating along the center axis of waveguide 502c) is further reflected from side 508-2 to propagate along the center axis of waveguide 502d, thereby producing a further change in direction of about $180°-\Omega_1$. As a result, the total change of direction produced by linker structures 504-1, 504-2, and 504-3 is about 180 degrees.

In one embodiment, the parabolic shapes and orientations of sides 508-1 and 508-2 and the lengths of waveguides 502b–c are chosen such that the focal points defined by these parabolic shapes substantially coincide and are located at side 508-3. This configuration can advantageously minimize coupling losses between waveguides 502a and 502d. In addition, when a collimated beam of light is coupled into waveguide 502a, a similarly collimated beam of light will be directed by linker structures 504-1, 504-2, and 504-3 into waveguide 502d. In one embodiment, angle $\Omega_1$ is about 120 degrees.

While this invention has been described with reference to illustrative embodiments, this description is not intended to be construed in a limiting sense. Waveguide turns of the invention may be implemented with non-TIR (e.g., metal coated reflective side) mirrors and/or have arbitrary angles. One, two, or more linker structures of the invention might be used to produce a desired turn angle. For example, depending on the refractive-index contrast between the core region and the trench, a 90-degree waveguide turn might be implemented with one, two, or more linker structures. Waveguide turns of the invention can be implemented using symmetric and/or non-symmetric reflector shapes. Devices of the invention may be designed for different wavelengths and waveguide modes and used for transmission of optical signals modulated with data. The principles of the invention may be applied to non-planar waveguides. Devices of the invention can be fabricated using conventional fabrication techniques. The materials may be appropriately doped as known in the art. Various surfaces may be modified, e.g., by metal deposition for enhanced reflectivity and/or electrical conductivity or by ion implantation for enhanced mechanical strength. Different layouts for waveguides may be realized as necessary and/or apparent to a person skilled in the art. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An optical device, comprising a first waveguide optically coupled to a second waveguide by a first reflective surface, wherein:
    each waveguide comprises a core region and a cladding region formed on a substrate, wherein the first reflective surface is a side of a first trench adjacent to the core regions of the first and second waveguides, wherein the side is covered with a reflective coating;
    the first and second waveguides are oriented with respect to one another at an angle other than 180 degrees;
    the first reflective surface has a substantially parabolic shape that has no plane of symmetry orthogonal to the substrate plane;
    the first reflective surface is adapted to direct light from the first waveguide to the second waveguide;
    the device further comprises a third waveguide optically coupled to the second waveguide by a second reflective surface, wherein:
        the second reflective surface is a side of a second trench adjacent to the core regions of the second and third waveguides;
        the second and third waveguides are oriented with respect to one another at an angle other than 180 degrees;
        the second reflective surface is adapted to direct light from the second waveguide to the third waveguide;
        the second reflective surface has a substantially parabolic shape; and
    a focal point defined by the parabolic shape of the first reflective surface substantially coincides with a focal point defined by the parabolic shape of the second reflective surface.

2. The invention of claim 1, wherein the first reflective surface has a curved shape.

3. The invention of claim 1, wherein at least one of focal points defined by the parabolic shapes is located inside the second waveguide.

4. The invention of claim 1, wherein the second reflective surface is adapted to reflect light based on total internal reflection (TIR).

5. The invention of claim 1, wherein:
    the parabolic shape of the first reflective surface is substantially a mirror image of the parabolic shape of the second reflective surface.

6. The invention of claim 1, wherein:
    the first trench comprises a first material;
    the core regions comprise a second material different from the first material; and
    the cladding regions comprise a third material different from the first and second materials.

7. An optical device, comprising:
    a first waveguide optically coupled to a second waveguide by a first reflective surface; and
    a third waveguide optically coupled to the second waveguide by a second reflective surface, wherein:
        each waveguide comprises a core region and a cladding region formed on a substrate, wherein: (i) the first reflective surface is a side of a first trench adjacent to the core regions of the first and second waveguides and (ii) the second reflective surface is a side of a second trench adjacent to the core regions of the second and third waveguides;
        the first and second waveguides are oriented with respect to one another at an angle other than 180 degrees;
        the second and third waveguides are oriented with respect to one another at an angle other than 180 degrees;
        the first reflective surface is adapted to direct light from the first waveguide to the second waveguide;
        the second reflective surface is adapted to direct light from the second waveguide to the third waveguide;
        the first and second reflective surfaces have substantially parabolic shapes, wherein the parabolic shape of at least one of the first and second reflective surfaces has no plane of symmetry orthogonal to the substrate plane; and
    a focal point defined by the parabolic shape of the first reflective surface substantially coincides with a focal point defined by the parabolic shape of the second reflective surface.

8. The invention of claim 7, wherein the parabolic shape of the first reflective surface is substantially a mirror image of the parabolic shape of the second reflective surface.

9. An optical device, comprising:
    a first waveguide optically coupled to a second waveguide by a first reflective surface;
    a third waveguide optically coupled to the second waveguide by a second reflective surface; and
    a fourth waveguide optically coupled to the third waveguide by a third reflective surface, wherein:
        each waveguide comprises a core region and a cladding region formed on a substrate, wherein: (i) the first reflective surface is a side of a first trench adjacent to the core regions of the first and second waveguides, (ii) the second reflective surface is a side of a second trench adjacent to the core regions of the second and third waveguides, and (iii) the third reflective surface is a side of a third trench adjacent to the core regions of the third and fourth waveguides;
        the first and second waveguides are oriented with respect to one another at an angle other than 180 degrees;
        the second and third waveguides are oriented with respect to one another at an angle other than 180 degrees;
        the third and fourth waveguides are oriented with respect to one another at an angle other than 180 degrees;
        the first reflective surface is adapted to direct light from the first waveguide to the second waveguide;
        the second reflective surface is adapted to direct light from the second waveguide to the third waveguide;
        the third reflective surface is adapted to direct light from the third waveguide to the fourth waveguide;
        the first and third reflective surfaces have substantially parabolic shapes, wherein the parabolic shape of at least one of the first and third reflective surfaces has no plane of symmetry orthogonal to the substrate plane;
the second reflective surface is substantially flat: and a focal point defined by the parabolic shape of the first reflective surface substantially coincides with a focal point defined by the parabolic shape of the third reflective surface and is located at the second reflective surface.

10. The invention of claim 9, wherein the parabolic shape of the first reflective surface is substantially a mirror image of the parabolic shape of the third reflective surface.

11. The invention of claim 9, wherein the light directed by the third reflective surface to the fourth waveguide has a propagation direction substantially opposite to a propagation direction of the light received by the first reflective surface from the first waveguide.

12. An optical device, comprising:
a first waveguide optically coupled to a second waveguide by a first reflective surface; and
a third waveguide optically coupled to the second waveguide by a second reflective surface, wherein:
each waveguide comprises a core region and a cladding region formed on a substrate, wherein: (i) the first reflective surface is a side of a first trench adjacent to the core regions of the first and second waveguides and (ii) the second reflective surface is a side of a second trench adjacent to the core regions of the second and third waveguides;
the first and second waveguides are oriented with respect to one another at an angle other than 180 degrees;
the second and third waveguides are oriented with respect to one another at an angle other than 180 degrees;
the first reflective surface is adapted to direct light from the first waveguide to the second waveguide;
the second reflective surface is adapted to direct light from the second waveguide to the third waveguide; and
the first and second reflective surfaces have substantially parabolic shapes, wherein a focal point defined by the parabolic shape of the first reflective surface substantially coincides with a focal point defined by the parabolic shape of the second reflective surface.

13. An optical device, comprising:
a first waveguide optically coupled to a second waveguide by a first reflective surface;
a third waveguide optically coupled to the second waveguide by a second reflective surface; and
a fourth waveguide optically coupled to the third waveguide by a third reflective surface, wherein:
each waveguide comprises a core region and a cladding region formed on a substrate, wherein: (i) the first reflective surface is a side of a first trench adjacent to the core regions of the first and second waveguides, (ii) the second reflective surface is a side of a second trench adjacent to the core regions of the second and third waveguides, and (iii) the third reflective surface is a side of a third trench adjacent to the core regions of the third and fourth waveguides;
the first and second waveguides are oriented with respect to one another at an angle other than 180 degrees;
the second and third waveguides are oriented with respect to one another at an angle other than 180 degrees;
the third and fourth waveguides are oriented with respect to one another at an angle other than 180 degrees;
the first reflective surface is adapted to direct light from the first waveguide to the second waveguide;
the second reflective surface is adapted to direct light from the second waveguide to the third waveguide;
the third reflective surface is adapted to direct light from the third waveguide to the fourth waveguide;
the first and third reflective surfaces have substantially parabolic shapes;
the second reflective surface is substantially flat; and
a focal point defined by the parabolic shape of the first reflective surface substantially coincides with a focal point defined by the parabolic shape of the third reflective surface and is located at the second reflective surface.

14. The invention of claim 13, wherein the first reflective surface has a substantially parabolic shape that has no plane of symmetry orthogonal to the substrate plane.

15. The invention of claim 13, wherein at least one of the second and third reflective surfaces is adapted to reflect light based on total internal reflection (TIR).

16. The invention of claim 13, wherein the second reflective surface is substantially flat.

* * * * *